(12) United States Patent
Jannusch et al.

(10) Patent No.: US 12,326,781 B2
(45) Date of Patent: Jun. 10, 2025

(54) SEMICONDUCTOR DEVICE WITH MODIFIED ACCESS AND ASSOCIATED METHODS AND SYSTEMS

(71) Applicant: Lodestar Licensing Group LLC, Evanston, IL (US)

(72) Inventors: Aaron Jannusch, Boise, ID (US); Brett K. Dodds, Boise, ID (US); Debra M. Bell, Boise, ID (US); Joshua E. Alzheimer, Boise, ID (US); Scott E. Smith, Plano, TX (US)

( * ) Notice: Subject to any disclaimer, the term of this patent is extended or adjusted under 35 U.S.C. 154(b) by 0 days.

(21) Appl. No.: 18/313,670

(22) Filed: May 8, 2023

(65) Prior Publication Data

US 2024/0078153 A1    Mar. 7, 2024

Related U.S. Application Data

(63) Continuation of application No. 17/350,099, filed on Jun. 17, 2021, now Pat. No. 11,687,403, which is a
(Continued)

(51) Int. Cl.
*G06F 11/10*    (2006.01)

(52) U.S. Cl.
CPC ........ *G06F 11/1044* (2013.01); *G06F 11/102* (2013.01); *G06F 11/1032* (2013.01)

(58) Field of Classification Search
CPC . G06F 11/1044; G06F 11/102; G06F 11/1032
See application file for complete search history.

(56) References Cited

U.S. PATENT DOCUMENTS

| 5,430,859 A | 7/1995 | Norman et al. |
| 6,212,631 B1 | 4/2001 | Springer et al. |

(Continued)

FOREIGN PATENT DOCUMENTS

| CN | 101401076 A | 4/2009 |
| CN | 101828175 A | 9/2010 |

(Continued)

OTHER PUBLICATIONS

CN Patent Application No. 202080059652.6—Chinese Office Action, dated Jan. 6, 2023, with English Translation, 14 pages.
(Continued)

*Primary Examiner* — Thien Nguyen

(57) ABSTRACT

Memory devices, systems including memory devices, and methods of operating memory devices are described, in which a host device may access a group of memory cells (e.g., portion of an array configurable to store ECC parity bits) otherwise reserved for ECC functionality of a memory device. The memory device may include a register to indicate whether its ECC functionality is enabled or disabled. When the register indicates the ECC functionality is disabled, the memory device may increase a storage capacity available to the host device by making the group of memory cells available for user-accessible data. Additionally or alternatively, the memory device may store metadata associated with various operational aspects of the memory device in the group of memory cells. Moreover, the memory device may modify a burst length to accommodate additional information to be stored in or read from the group of memory cells.

14 Claims, 6 Drawing Sheets

Related U.S. Application Data continuation of application No. 16/554,913, filed on Aug. 29, 2019, now Pat. No. 11,042,436.

(56) References Cited

U.S. PATENT DOCUMENTS

| | | |
|---|---|---|
| 8,239,732 B2 | 8/2012 | Tan et al. |
| 8,495,467 B1 | 7/2013 | Billing et al. |
| 8,898,548 B1 | 11/2014 | Mullendore et al. |
| 9,594,676 B2 | 3/2017 | Radke et al. |
| 10,847,246 B2 | 11/2020 | Shin et al. |
| 10,963,336 B2 | 3/2021 | Veches |
| 11,042,436 B2 | 6/2021 | Jannusch et al. |
| 11,216,323 B2 | 1/2022 | Ki |
| 11,379,299 B2 | 7/2022 | Veches |
| 2002/0013924 A1 | 1/2002 | Yamamoto |
| 2005/0144542 A1 | 6/2005 | Minagawa et al. |
| 2006/0047920 A1 | 3/2006 | Moore et al. |
| 2006/0218467 A1 | 9/2006 | Sibigtroth et al. |
| 2008/0072117 A1 | 3/2008 | Syzdek et al. |
| 2009/0113272 A1 | 4/2009 | Tan et al. |
| 2010/0182856 A1* | 7/2010 | Koshizuka .............. G11C 7/22 365/194 |
| 2010/0257332 A1 | 10/2010 | Janzen et al. |
| 2011/0252288 A1 | 10/2011 | Sharon et al. |
| 2013/0013879 A1* | 1/2013 | Yamada ............ G06F 13/1668 711/E12.001 |
| 2013/0039129 A1 | 2/2013 | Radke et al. |
| 2013/0179752 A1 | 7/2013 | Shim et al. |
| 2014/0136927 A1 | 5/2014 | Li et al. |
| 2014/0229655 A1 | 8/2014 | Goss et al. |
| 2014/0258811 A1 | 9/2014 | Liu et al. |
| 2014/0281808 A1 | 9/2014 | Lam |
| 2015/0033096 A1 | 1/2015 | Radke et al. |
| 2015/0100852 A1 | 4/2015 | Huang et al. |
| 2015/0169406 A1 | 6/2015 | Li et al. |
| 2015/0205665 A1 | 7/2015 | Kuo et al. |
| 2016/0092307 A1 | 3/2016 | Bonen et al. |
| 2016/0224414 A1 | 8/2016 | Trombley |
| 2017/0060681 A1 | 3/2017 | Halbert et al. |
| 2017/0160952 A1* | 6/2017 | Nakanishi .......... G06F 12/1408 |
| 2017/0308433 A1 | 10/2017 | Kwon et al. |
| 2018/0157441 A1 | 6/2018 | Bains et al. |
| 2018/0210787 A1* | 7/2018 | Bains .................... G11C 11/409 |
| 2018/0336090 A1 | 11/2018 | Minzoni |
| 2018/0336094 A1 | 11/2018 | Fu |
| 2018/0336959 A1 | 11/2018 | Minzoni |
| 2019/0035438 A1 | 1/2019 | Pekny et al. |
| 2019/0050316 A1* | 2/2019 | Kim ..................... G06F 3/0619 |
| 2019/0179685 A1 | 6/2019 | Ki |
| 2019/0229753 A1 | 7/2019 | Cha |
| 2019/0243708 A1 | 8/2019 | Cha et al. |
| 2019/0250985 A1 | 8/2019 | Seo et al. |
| 2019/0258539 A1* | 8/2019 | Zhu .................... G06F 13/1668 |
| 2019/0340065 A1 | 11/2019 | Radke et al. |
| 2019/0347158 A1 | 11/2019 | Chung et al. |
| 2020/0151053 A1 | 5/2020 | Cha et al. |
| 2020/0183778 A1 | 6/2020 | Kim et al. |
| 2020/0266929 A1 | 8/2020 | Wu et al. |
| 2020/0301776 A1 | 9/2020 | Cha |
| 2021/0064467 A1 | 3/2021 | Buerkle et al. |
| 2021/0216397 A1 | 7/2021 | Veches |
| 2022/0091938 A1 | 3/2022 | Buerkle et al. |
| 2022/0334917 A1 | 10/2022 | Veches |

FOREIGN PATENT DOCUMENTS

| | | |
|---|---|---|
| CN | 102163133 A | 8/2011 |
| CN | 102257573 A | 11/2011 |
| CN | 103197897 A | 7/2013 |
| CN | 103797541 A | 5/2014 |
| CN | 103984605 A | 8/2014 |
| CN | 106663045 A | 5/2017 |
| CN | 109964213 A | 7/2019 |
| CN | 110085277 A | 8/2019 |
| KR | 10-2008-0013992 A | 2/2008 |
| KR | 10-2013-0096753 A | 8/2013 |
| KR | 10-2017-0052576 A | 5/2017 |
| KR | 10-2017-0109568 A | 9/2017 |
| KR | 10-2019-0017223 A | 2/2019 |
| WO | 2010/069045 A1 | 6/2010 |

OTHER PUBLICATIONS

International Application No. PCT/US2020/044654—International Search Report and Written Opinion, dated Nov. 11, 2020, 10 pages.
International Application No. PCT/US2020/044656—International Search Report and Written Opinion, dated Oct. 26, 2020, 8 pages.
Office Action dated Jun. 29, 2022 for Chinese Patent Application No. 202080059652.6, 11 pages.
U.S. Appl. No. 16/554,931—Unpublished U.S. Patent Application by Todd M. Buerkle et al., titled "Semiconductor Device With Modified Command and Associated Methods and Systems", filed Aug. 29, 2019, 43 pages.
U.S. Appl. No. 16/554,958—Unpublished U.S. Patent Application by Anthony D. Veches et al., titled "Semiconductor Device With User Defined Operations and Associated Methods and Systems", filed Aug. 29, 2019, 38 pages.
Chinese patent office, "China Office Action," issued in connection with China Patent Application No. 202010876359.0 dated Jun. 27, 2024 (8 pages total; 6 pages Original & 2 pages English translation).
Drukarev A., "Performance of error-correcting codes on channels with memory", IEEE transactions on communications, vol. 34, Issue. 6, Jun. 30, 1986, pp. 513-521.
Xiaolong, N., "Design and Simulation of DDR3 SDRAM Controller and PHY", China's Excellent Master's Degree, Issue 01, Jan. 15, 2018, pp. 65.

\* cited by examiner

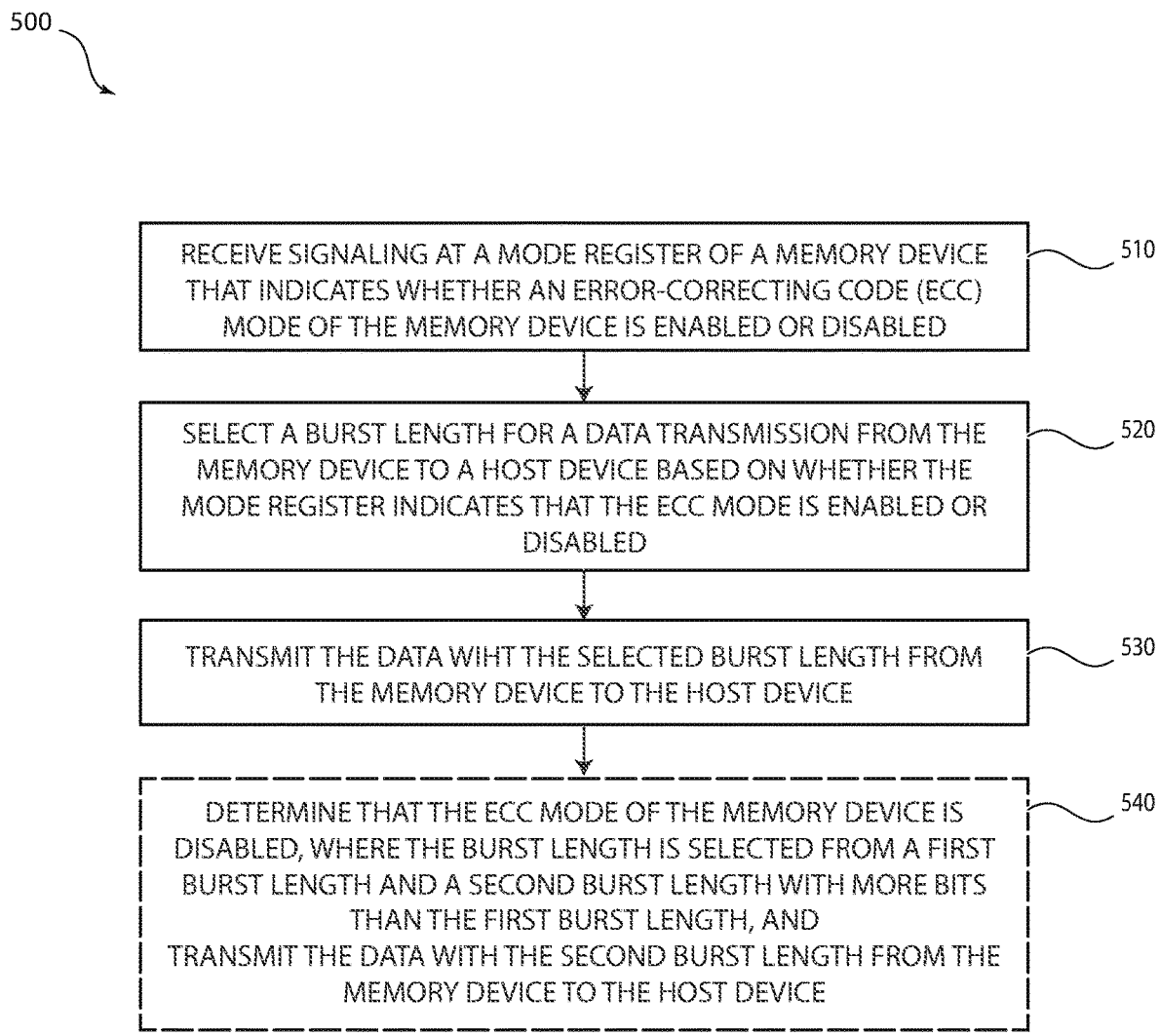

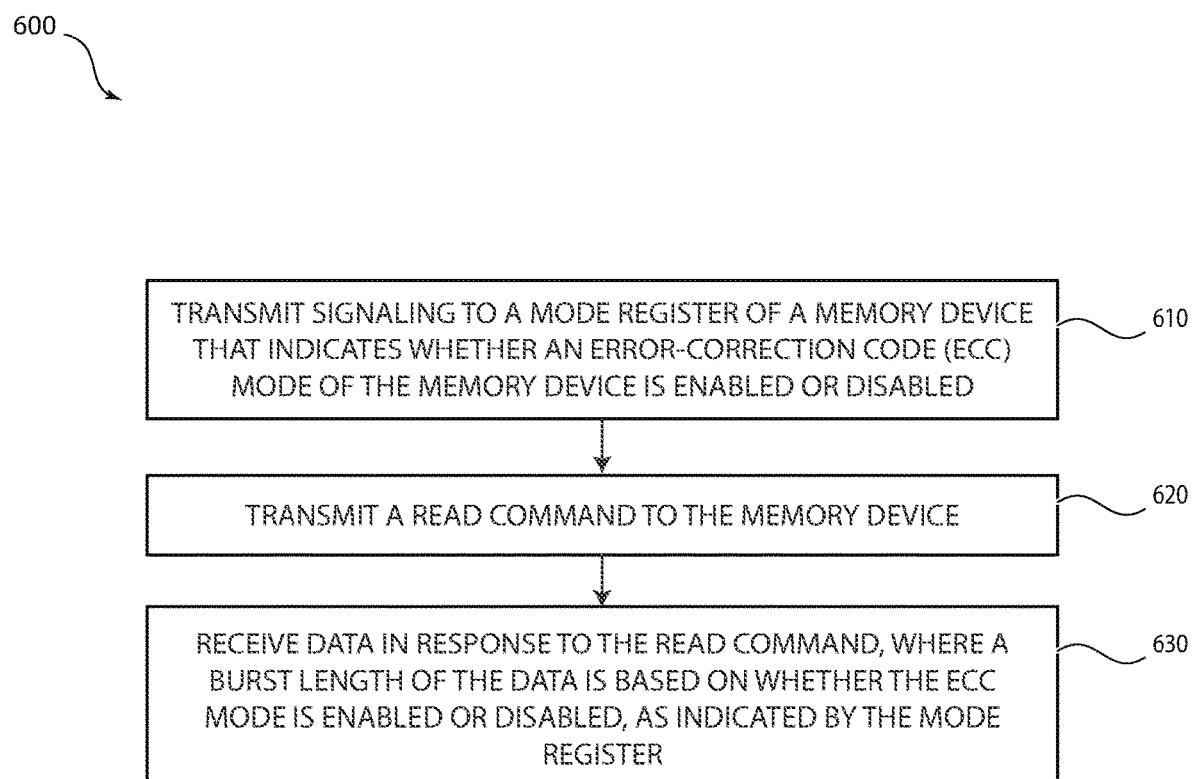

SEMICONDUCTOR DEVICE WITH MODIFIED ACCESS AND ASSOCIATED METHODS AND SYSTEMS

CROSS-REFERENCE TO RELATED APPLICATIONS

This application is a continuation of U.S. patent application Ser. No. 17/350,099, filed Jun. 17, 2021, which is a continuation of U.S. patent application Ser. No. 16/554,913, filed Aug. 29, 2019, now U.S. Pat. No. 11,042,436; which are incorporated herein by reference in their entirety.

TECHNICAL FIELD

The present disclosure generally relates to semiconductor devices, and more particularly relates to a semiconductor device with modified access and associated methods and systems.

BACKGROUND

Memory devices are widely used to store information related to various electronic devices such as computers, wireless communication devices, cameras, digital displays, and the like. Memory devices are frequently provided as internal, semiconductor, integrated circuits and/or external removable devices in computers or other electronic devices. There are many different types of memory, including volatile and non-volatile memory. Volatile memory, including random-access memory (RAM), static random access memory (SRAM), dynamic random access memory (DRAM), and synchronous dynamic random access memory (SDRAM), among others, require a source of applied power to maintain its data. Non-volatile memory, by contrast, can retain its stored data even when not externally powered. Non-volatile memory is available in a wide variety of technologies, including flash memory (e.g., NAND and NOR), phase change memory (PCM), ferroelectric random access memory (FeRAM), resistive random access memory (RRAM), and magnetic random access memory (MRAM), among others. Improving memory devices, generally, may include increasing memory cell density, increasing read/write speeds or otherwise reducing operational latency, increasing reliability, increasing data retention, reducing power consumption, or reducing manufacturing costs, among other metrics.

BRIEF DESCRIPTION OF THE DRAWINGS

FIGS. 5 and 6 are flow charts illustrating methods of operating a memory device in accordance with an embodiment of the present technology.

DETAILED DESCRIPTION

Figure 1:
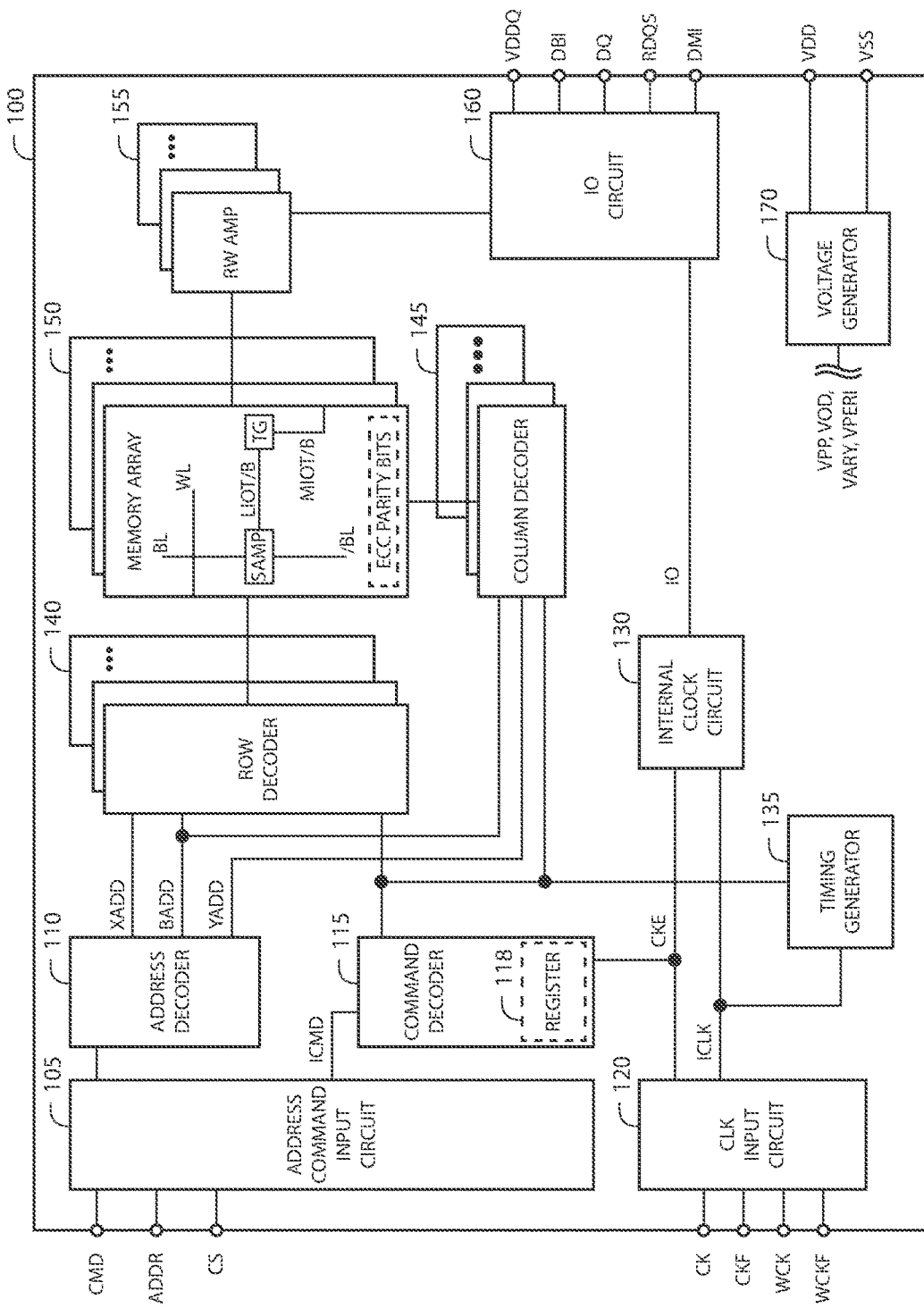
FIG. 1 is a block diagram schematically illustrating a memory device in accordance with an embodiment of the present technology.

A memory device may include error checking and correcting (ECC) functions to provide reliable data—e.g., on-die ECC functionality. An algorithm, program, or circuitry that performs the ECC function may be referred to as or include aspects of error-correcting codes (which may also be referred to as error-correction codes). Such a memory device may include an ECC circuit and a group of memory cells (e.g., a portion of memory array configured to store ECC parity bits, ECC array) that supports the on-die ECC functionality. In some embodiments, the group of memory cells may be reserved to internally store ECC data (e.g., inaccessible to users) and the specified storage capacity of the memory device may not include the ECC array capacity. In some examples, the ECC array capacity may occupy an appreciable portion of a memory array of the memory device—e.g., approximately 6% of a total memory array space. Some memory systems may include a host device coupled with the memory devices that include on-die ECC functionality and the host device (or the memory system) may perform its own ECC functions without relying on the on-die ECC functionality. Accordingly, the group of memory cells reserved to support the on-die ECC functionality may be employed to provide additional features that may be otherwise unavailable—e.g., an additional storage capacity beyond the specified storage capacity indicated as available to users of the memory device.

Several embodiments of the present technology are directed to memory devices, systems including memory devices, and methods of operating memory devices in which a host device may access a group of memory cells reserved for ECC functionality in a memory device when the ECC functionality is disabled—e.g., by the host device. In one embodiment, the memory device includes a register to indicate whether the ECC functionality is enabled or disabled. When the ECC functionality is disabled, the memory device may configure the group of memory cells to store user data, metadata, or both. As a result, the memory device may increase a storage capacity available to the host device—e.g., increased bit output by approximately 6%.

Metadata in a memory device may refer to various data associated with other data (e.g., data being transmitted or received) or operational aspects of the memory device, such as operating temperatures, latency settings, data transmission parameters. In some embodiments, the memory device may store the metadata in one or more registers, to which an output circuit of the memory device has access. In some embodiments, the memory device may store the metadata in the memory array (including the group of memory cells reserved for the ECC functionality, when the ECC functionality is disabled). After the memory device stores the metadata in the memory array, the metadata may be regarded as part of user data for future accesses. As such, the memory device may output the metadata (when stored in the memory array) without utilizing a separate command (e.g., mode register read (MRR) command to read the metadata stored in one or more registers) as part of access commands (e.g., read commands).

Moreover, when the register indicates the on-die ECC functionality is disabled, the memory device may modify a burst length to accommodate additional information to be stored in (e.g., additional user data) or read from (e.g., additional user data or metadata) the group of memory cells. For example, when the register indicates the on-die ECC functionality is enabled, the memory device may use a first burst length (e.g., BL32, which corresponds to sixteen (16) clock cycles under a double data rate (DDR) scheme). When the register indicates the on-die ECC functionality is disabled, however, the memory device may use a second burst length (e.g., BL34, which corresponds to seventeen (17)

clock cycles under the DDR scheme) to incorporate an additional amount of data (e.g., user data or meta data associated with the group of memory cells that is otherwise reserved for the ECC functionality).

A memory device that supports an embodiment of the present technology is described with reference to FIG. 1. More detailed descriptions of the memory device are provided with reference to FIG. 2. FIG. 3 further illustrates various operational aspects of the memory device in accordance with an embodiment of the present technology. A memory system that supports an embodiment of the present technology is described with reference to FIG. 4. Flow charts illustrating methods of operating the memory device are described with reference to FIGS. 5 and 6.

FIG. 1 is a block diagram schematically illustrating a memory device 100 in accordance with an embodiment of the present technology. The memory device 100 may include an array of memory cells, such as memory array 150. The memory array 150 may include a plurality of banks (e.g., banks 0-15 in the example of FIG. 1), and each bank may include a plurality of word lines (WL), a plurality of bit lines (BL), and a plurality of memory cells (e.g., m×n memory cells) arranged at intersections of the word lines (e.g., m word lines, which may also be referred to as rows) and bit lines (e.g., n bit lines, which may also be referred to as columns). Memory cells can include any one of a number of different memory media types, including capacitive, magnetoresistive, ferroelectric, phase change, or the like. In some embodiments, a portion of the memory array 150 (e.g., ECC plane) may be configurable to store ECC parity bits. That is, the memory array 150 may include a first subset of memory cells configured to store user-accessible data and a second subset of memory cells (e.g., ECC parity bits) configured to store different kinds of data—e.g., ECC data when an ECC function is enabled, non-ECC data when the ECC function is disabled. The selection of a word line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least one respective main I/O line pair (MIOT/B), via transfer gates (TG), which can function as switches. The memory array 150 may also include plate lines and corresponding circuitry for managing their operation.

In some embodiments, the memory array 150 includes a memory array including a set of memory cells. The set of memory cells may include a first subset of memory cells configured to store user-accessible data (e.g., data from a host device). Moreover, the set of memory cells may include a second subset of memory cells reserved to store ECC data to support ECC functionality of the memory device 100. Accordingly, when the ECC functionality is enabled, a host device may not directly access the second subset of memory cells. When the ECC functionality is disabled, however, the memory device 100 may configure the second subset of memory cells to store additional user-accessible data (e.g., allowing access from a host device), metadata associated with the memory device 100, or both. In some embodiments, the memory device 100 may configure the second subset of memory cells to store additional user-accessible data (e.g., the entire memory array 150 configured to store user-accessible data) and store the metadata elsewhere—e.g., one or more registers of the memory device 100. Further, the memory device 100 may include a register (e.g., mode register) configured to indicate whether the ECC function is enabled or disabled.

The memory device 100 may employ a plurality of external terminals that include command and address terminals coupled to a command bus and an address bus to receive command signals CMD and address signals ADDR, respectively. The memory device may further include a chip select terminal to receive a chip select signal CS, clock terminals to receive clock signals CK and CKF, data clock terminals to receive data clock signals WCK and WCKF, data terminals DQ, RDQS, DBI (for data bus inversion function), and DMI (for data mask inversion function), power supply terminals VDD, VSS, VDDQ, and VSSQ.

The command terminals and address terminals may be supplied with an address signal and a bank address signal from outside. The address signal and the bank address signal supplied to the address terminals can be transferred, via a command/address input circuit 105, to an address decoder 110. The address decoder 110 can receive the address signals and supply a decoded row address signal (XADD) to the row decoder 140, and a decoded column address signal (YADD) to the column decoder 145. The address decoder 110 can also receive the bank address portion of the ADDR input and supply the decoded bank address signal (BADD) to both the row decoder 140 and the column decoder 145.

The command and address terminals may be supplied with command signals CMD, address signals ADDR, and chip select signals CS, from a memory controller. The command signals may represent various memory commands from the memory controller (e.g., including access commands, which can include read commands and write commands). The chip select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to a command decoder 115 via the command/address input circuit 105. The command decoder 115 may include circuits to decode the internal command signals ICMD to generate various internal signals and commands for performing memory operations, for example, a row command signal to select a word line and a column command signal to select a bit line. The internal command signals can also include output and input activation commands, such as clocked command CMDCK (not shown in FIG. 1).

The command decoder 115, in some embodiments, may further include one or more registers 118 for tracking various counts or values (e.g., counts of refresh commands received by the memory device 100 or self-refresh operations performed by the memory device 100). In some embodiments, a subset of registers 118 may be referred to as mode registers and configured to store user-defined variables to provide flexibility in performing various functions, features, and modes (e.g., ECC modes). For example, the memory device 100 may receive a signaling from a host device at the mode registers indicating whether an ECC mode of the memory device is enabled or disabled—e.g., whether the ECC function of the memory device 100 is enabled or disabled. The memory device 100, based on the indication stored at the mode registers, may access the ECC parity bits of memory array 150 and perform various operations—e.g., executing the ECC function using the ECC parity bits, storing/retrieving user-accessible data or metadata at/from the ECC parity bits.

When a read command is issued to a bank with an open row and a column address is timely supplied as part of the read command, read data can be read from memory cells in the memory array 150 designated by the row address (which may have been provided as part of the Activate command identifying the open row) and column address. The read command may be received by the command decoder 115, which can provide internal commands to input/output circuit 160 so that read data can be output from the data terminals DQ, RDQS, DBI, and DMI via read/write amplifiers 155 and the input/output circuit 160 according to the RDQS clock signals. The read data may be provided at a time defined by read latency information RL that can be programmed in the memory device 100, for example, in a mode register (e.g., register 118). The read latency information RL can be defined in terms of clock cycles of the CK clock signal. For example, the read latency information RL can be a number of clock cycles of the CK signal after the read command is received by the memory device 100 when the associated read data is provided.

When a write command is issued to a bank with an open row and a column address is timely supplied as part of the write command, write data can be supplied to the data terminals DQ, DBI, and DMI according to the WCK and WCKF clock signals. The write command may be received by the command decoder 115, which can provide internal commands to the input/output circuit 160 so that the write data can be received by data receivers in the input/output circuit 160, and supplied via the input/output circuit 160 and the read/write amplifiers 155 to the memory array 150. The write data may be written in the memory cell designated by the row address and the column address. The write data may be provided to the data terminals at a time that is defined by write latency WI information. The write latency WI information can be programmed in the memory device 100, for example, in a mode register (e.g., register 118). The write latency WI information can be defined in terms of clock cycles of the CK clock signal. For example, the write latency information WI can be a number of clock cycles of the CK signal after the write command is received by the memory device 100 when the associated write data is received.

Under the DDR scheme, a data burst having a burst length 2N (e.g., eight (8), sixteen (16), thirty-two (32)) includes 2N bits of data transmitted for each output pin (e.g., each data terminal DQ) of the memory device during N (e.g., four (4), eight (8), sixteen (16)) clock cycles. In some embodiments, the input/output circuit 160 may be configured to communicate with a host device (e.g., transmitting or receiving data via the data terminals DQ) for a first burst length when the register (e.g., mode register) indicates that the ECC function is enabled. For example, the first burst length may be thirty-two (32), which corresponds to sixteen (16) clock cycles (e.g., WCK and WCKF clock cycles) under the DDR scheme. The first burst length may be determined to communicate (e.g., transmit or receive) the user-accessible data in the first subset of memory cells within a data burst. In some embodiments, when the ECC function is enabled, the input/output circuit 160 may output metadata (e.g., metadata stored on one or more registers) during additional data burst(s) (i.e., data burst(s) additional to the first burst length).

Moreover, the input/output circuit 160 may be configured to communicate with the host device for a second burst length when the register (e.g., mode register) indicates that the ECC function is disabled. For example, the second burst length may be thirty-four (34), which corresponds to seventeen (17) clock cycles under the DDR scheme. The second burst length may be determined to communicate the user-accessible data in the first subset of memory cells and the additional user-accessible data or the metadata in the second subset of memory cells within a data burst. In some embodiments, the metadata may be stored elsewhere (e.g., the register 180 to which the input/output circuit 160 has access) and not be stored in the second subset of memory cells (or in the first subset of memory cells). In some embodiments, the second burst length (e.g., the longer data burst) may be more than one (1) clock cycle longer than the first burst length (e.g., the shorter data burst)—e.g., two (2) clock cycles longer, three (3) clock cycles longer, or even more.

In some embodiments, the memory device 100 may receive signaling at register 118 (e.g., a mode register) that indicates whether the ECC mode (e.g., the ECC function) of the memory device 100 is enabled or disabled. The memory device 100 may select, in response to receiving the signaling, a burst length for a data transmission to a host device based on whether the mode register indicates that the ECC mode is enabled or disabled. Subsequently, the memory device 100 may transmit the data with the selected burst length to the host device. In some embodiments, the memory device 100 may determine that the ECC mode is disabled and select a burst length from a first burst length and a second burst length that includes more bits than the first burst length. The memory device 100 may transmit the data with the selected burst length (e.g., the second burst length).

The power supply terminals may be supplied with power supply potentials VDD and VSS. These power supply potentials VDD and VSS can be supplied to an internal voltage generator circuit 170. The internal voltage generator circuit 170 can generate various internal potentials VPP, VOD, VARY, VPERI, and the like based on the power supply potentials VDD and VSS. The internal potential VPP can be used in the row decoder 140, the internal potentials VOD and VARY can be used in the sense amplifiers included in the memory array 150, and the internal potential VPERI can be used in many other circuit blocks.

The power supply terminal may also be supplied with power supply potential VDDQ. The power supply potential VDDQ can be supplied to the input/output circuit 160 together with the power supply potential VSS. The power supply potential VDDQ can be the same potential as the power supply potential VDD in an embodiment of the present technology. The power supply potential VDDQ can be a different potential from the power supply potential VDD in another embodiment of the present technology. However, the dedicated power supply potential VDDQ can be used for the input/output circuit 160 so that power supply noise generated by the input/output circuit 160 does not propagate to the other circuit blocks.

The clock terminals and data clock terminals may be supplied with external clock signals and complementary external clock signals. The external clock signals CK, CKF, WCK, WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a CKE signal from the command decoder 115, an input buffer can receive the CK and CKF signals and the WCK and WCKF signals. The clock input circuit 120 can receive the external clock signals to generate internal clock signals ICLK. The internal clock signals ICLK can be supplied to an internal clock circuit 130. The internal clock circuit 130 can provide various phase and frequency controlled internal clock signal based on the received internal clock signals ICLK and a clock enable signal CKE from the command decoder 115. For example, the internal clock circuit 130 can include a clock path (not shown in FIG. 1) that receives the internal clock signal ICLK and provides various clock signals to the command decoder 115. The internal clock circuit 130 can further provide input/output (IO) clock signals. The IO clock signals can be supplied to the input/output circuit 160 and can be used as a timing signal for determining an output timing of read data and the input timing of write data. The IO clock signals can be provided at multiple clock frequencies so that data can be output from and input to the memory device 100 at different data rates. A higher clock frequency may be desirable when high memory speed is desired. A lower clock frequency may be desirable when lower power consumption is desired. The internal clock signals ICLK can also be supplied to a timing generator 135 and thus various internal clock signals can be generated.

The memory device 100 can be connected to any one of a number of electronic devices capable of utilizing memory for the temporary or persistent storage of information, or a component thereof. For example, a host device of memory device 100 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to memory device 100, although in other embodiments, the host device may be indirectly connected to memory device (e.g., over a networked connection or through intermediary devices).

Figure 2:
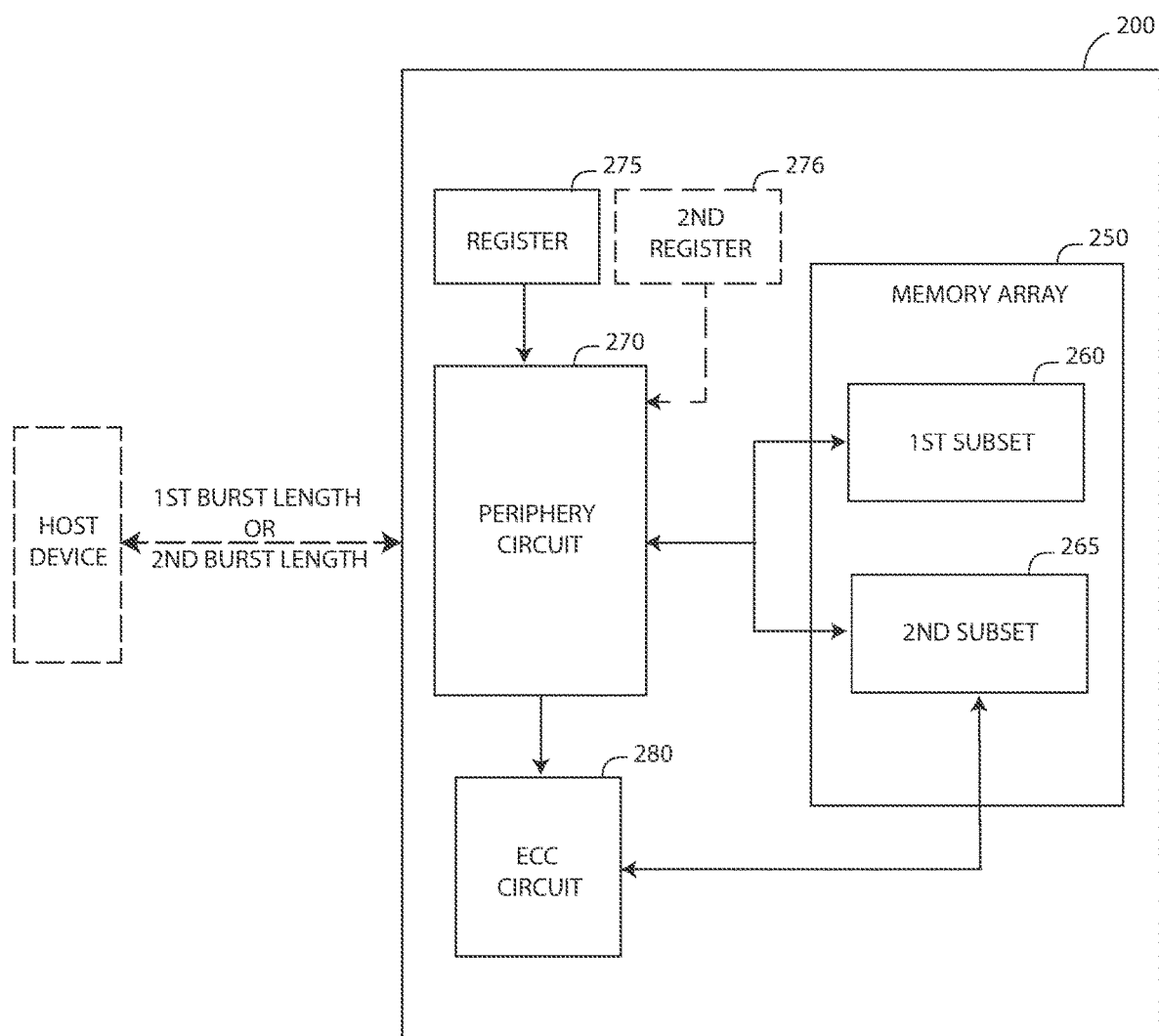
FIG. 2 is a block diagram schematically illustrating a memory device in accordance with an embodiment of the present technology.
Figure 3:
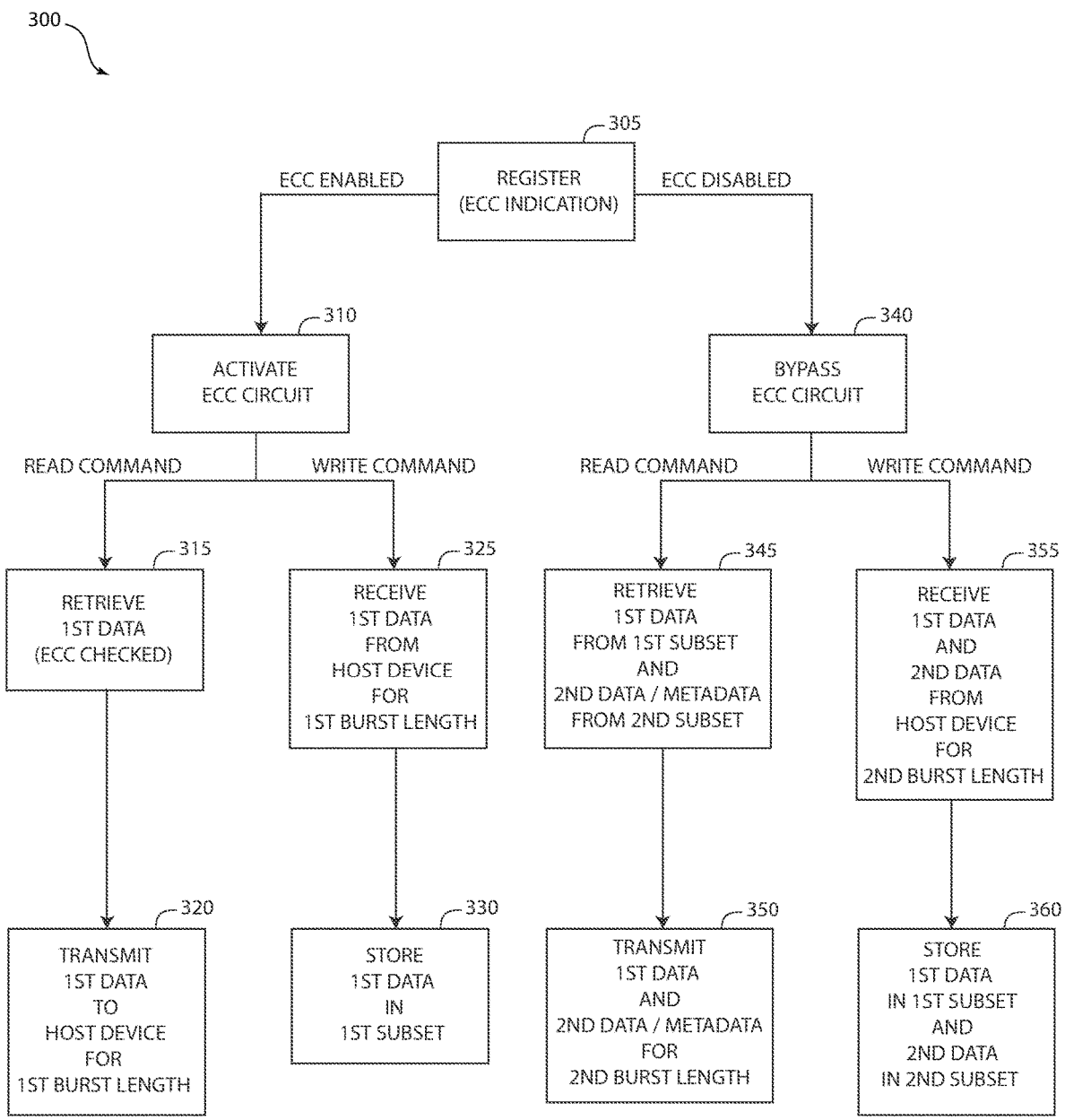
FIG. 3 is a flow chart illustrating an overall synopsis of a method of operating a memory device in accordance with an embodiment of the present technology.

FIG. 2 is a block diagram schematically illustrating a memory device 200 in accordance with an embodiment of the present technology. The memory device 200 may be an example or include aspects of the memory device 100 described with reference to FIG. 1. The memory device 200 may include a periphery circuit 270, a register 275, an ECC circuit 280, and a memory array 250. The periphery circuit 270 may include aspects of various components described with reference to FIG. 1. For example, the periphery circuit 270 may include aspects of the command/address input circuit 105, the address decoder 110, the command decoder 115, and the input/output circuit 160, among others. Moreover, the memory array 250 may be an example or include aspects of the memory array 150 described with reference to FIG. 1.

The register 275 (which may also be referred to as a mode register) may be configured to indicate whether an ECC function of the memory device 200 (e.g., on-die ECC functionality) is enabled or disabled. In some embodiments, a host device coupled with the memory device 200 may perform an ECC function without relying on the on-die ECC functionality of the memory device 200. In such cases, the register 275 may indicate that the on-die ECC functionality is disabled (e.g., by the host device) such that the memory device 200 may modify certain operational aspects to provide additional features to the host device.

The memory array 250 may comprise a set of memory cells including a first subset 260 and a second subset 265. The first subset 260 may be configured to store first user-accessible data—e.g., data from the host device. In some embodiments, the first subset 260 may occupy a major portion of the storage capacity of the memory array 250—e.g., greater than 90% of the storage capacity. The first subset 260 may represent a portion of the memory array 250, which may be accessible by the host device regardless of whether the on-die ECC functionality is enabled or disabled. In some embodiments, the second subset 265 may be configured to store ECC data that support the on-die ECC functionality of the memory device 200 when the ECC function is enabled-hence, the second subset 265 may also be referred to as ECC parity bits or parity plane. The second subset 265 may occupy a relatively minor but appreciable portion of the storage capacity of memory array 250—e.g., approximately 5 to 10% of the storage capacity. In some embodiments, the second subset 265 may be inaccessible by the host device when the ECC function is enabled. In other embodiments, the second subset 265 may be accessible by the host device when the ECC function is enabled such that the host device may access the ECC data.

The second subset 265, however, when the ECC function is disabled, may be configured to store second user-accessible data (e.g., data from the host device), metadata associated with the memory device 200, or both. When the second subset 265 is configured to store the second user-accessible data, the memory device 200 may provide an increased storage capacity to the host device—e.g., almost 100% of the entire storage capacity (i.e., the entire storage capacity corresponding to the first subset 260 and the second subset 265). That is, the memory device 200 can provide an extra storage capacity (i.e., the storage capacity corresponding to the second subset 265) to the host device in addition to the storage capacity corresponding to the first subset 260 (which may be referred to as the specified storage capacity of the memory device). Moreover, the first subset 260 and the second subset 265 may provide the first and second user-accessible data uncorrected by the ECC function of the memory device 200. Such uncorrected user-accessible data may provide opportunities for the host device to optimize and/or modify its ECC routines in case of a change in error property and/or characteristics.

Additionally or alternatively, the second subset 265 may be configured to store the metadata comprising information related to operational modes of the memory device 200, such as, operating temperatures, latency settings associated with access commands, parameters for data transmissions, test modes, or a combination thereof. In this manner, the memory device 200 may provide the metadata as part of access operations (e.g., read commands directed to the first subset 260) without having to incur commands (e.g., MRR command) to retrieve the metadata that may be stored otherwise in various registers (e.g., mode registers) of the memory device 200. Such commands retrieving the metadata from the registers may introduce undesirable delay for the memory device 200 because the commands may put the memory device 200 in a specific mode (e.g., "status" mode) resulting in the memory array 250 in a certain condition (e.g., "idle" condition). Consequently, using such commands may be restricted and the host device's visibility to the metadata may also be limited.

In some embodiments, the second subset 265 may be organized to be physically adjacent (or in close proximity) to the first subset 260 such that certain components of the memory device 200 (e.g., row decoder 140, column decoder 145, read/write amplifier 155, sense amplifiers (SAMP)) that support the first subset 260 and the second subset 265 may be shared or efficiently laid out. In other embodiments, the second subset 265 may be organized to be separate from the first subset 260 such that the first subset 260 and the second subset 265 may operate relatively independently of each other—e.g., the first and the second subsets having separate power domains, separate routing of control and/or data paths.

The ECC circuit 280 provides an ECC function for the memory device 200 when the ECC function is enabled. The ECC circuit may be coupled with the second subset 265 and perform the ECC function for the first user-accessible data stored in the first subset 260 using the ECC data stored in the second subset 265. In some embodiments, the ECC circuit 280 may be configured to detect two or more errors and/or to correct one or more errors in the first user-accessible data. For example, the ECC circuit 280 may detect two bits of errors and correct one bit of error in the first user-accessible data. In some embodiments, the ECC circuit 280 may be configured to indicate that the first user-accessible data includes a quantity of errors greater than its detection and correction capability.

The periphery circuit 270 may be configured to communicate with the host device for a first burst length (e.g., BL32) when the register 275 indicates the ECC function is enabled, where the first burst length is used for communicating the first user-accessible data in the first subset 260. Additionally, the periphery circuit 270 may be configured to communicate with the host device for a second burst length (e.g., BL34, BL36, BL38, BL40) when the register 275 indicates the ECC function is disabled, where the second burst length is used for communicating the first user-accessible data in the first subset 260 and the second user-accessible data or the metadata in the second subset 265. In some embodiments, the periphery circuit 270 may include a logic circuit (e.g., a first logic circuit) coupled with the memory array 250 (hence the first subset 260 and the second subset 265). The first logic circuit may be configured to combine the first user-accessible data and the second user-accessible data or the metadata for transmission to the host device when the register 275 indicates the ECC function is disabled.

In some embodiments, when the ECC function is enabled, the memory device 200 (e.g., the periphery circuit 270) may be configured to provide ECC data stored at the second subset 265 to the host device (e.g., the ECC data associated with user-accessible data stored at the first subset 260). In such embodiments, a burst length may be modified (e.g., increased to BL34 from BL32) when the memory device 200 transmits both the user-accessible data stored at the first subset 260 and the ECC data stored at the second subset 265. In other embodiments, when the ECC function is disabled, the memory device 200 (e.g., the periphery circuit 270) may be configured to communicate with the host device (e.g., retrieve and transmit the user-accessible data stored at the first subset 260, receive and store the user-accessible data at the first subset 260) without modifying a burst length—e.g., using a single burst length (e.g., BL32) for transmitting (or receiving) the user-accessible data to (or from) the host device regardless of whether the ECC function is enabled or disabled. In such embodiments, the user-accessible data may be uncorrected by the ECC function of the memory device 200.

In some embodiments, access commands (e.g., read commands, write commands) may be directed to the first subset 260 or both the first subset 260 and the second subset 265. In such embodiments, the memory device (e.g., the periphery circuit 270) may operate based on whether the ECC function is enabled or disabled and/or whether access commands are directed to the first subset 260 or both the first subset 260 and the second subset 265. For example, when the ECC function is enabled and when the access commands are directed to the first subset 260, the memory device 200 may communicate with the host device for a first burst length (e.g., BL32) that corresponds to the first user-accessible data at the first subset 260. In another example, when the ECC function is enabled and when the access commands are directed to both the first subset 260 and the second subset 265, the memory device 200 may communicate with the host device for a second burst length (e.g., BL34) that corresponds to the first user-accessible data at the first subset 260 and the ECC data at the second subset 265.

In yet another example, when the ECC function is disabled and when the access commands are directed to both the first subset 260 and the second subset 265, the memory device 200 may communicate with the host device for the second burst length (e.g., BL34) that corresponds to the first user-accessible data at the first subset 260 and the second user-accessible data or the meta data at the second subset 265. In yet another example, when the ECC function is disabled and when the access commands are directed to the first subset 260, the memory device 200 may communicate with the host device for the first burst length (e.g., BL32) that corresponds to the first user-accessible data in the first subset 260. In some embodiments, the memory device 200 may include an additional register 276 (drawn in phantom in FIG. 2) configured to indicate whether access commands (e.g., read commands, write commands) are directed to the first subset 260 or both the first subset 260 and the second subset 265. In such embodiments, the memory device 200 (e.g., the periphery circuit 270) may operate based on the register 275 (e.g., indicating whether the ECC function is enabled or disabled) and the additional register 276 (e.g., indicating whether access commands are directed to the first subset 260 or both the first subset 260 and the second subset 265).

Although in the foregoing example embodiments, memory devices with memory arrays having first subsets occupying greater than 90% of the storage capacity thereof and second subsets occupying less than 10% of the storage capacity thereof have been described and illustrated, in other embodiments memory devices may be provided with memory arrays having different allocations of capacity. For example, first subsets having less than 90% of the storage capacity (e.g., 75%, 66%, or even 50% or less) may be provided.

FIG. 3 is a flow chart 300 illustrating an overall synopsis of a method of operating a memory device in accordance with an embodiment of the present technology. The flow chart 300 may be an example of or include aspects of a method that the memory device 200 (or the periphery circuit 270 of the memory device 200) may perform. Such memory device (e.g., the memory device 100 or 200) may include a memory array (e.g., the memory array 150 or 250) having a set of memory cells, where the set of memory cells includes a first subset (e.g., the first subset 260) configured to store first user-accessible data and a second subset (e.g., the second subset 265) configured to store ECC data. Further, the memory device may maintain a register (e.g., the register 275) configured to indicate whether an ECC function is enabled or disabled.

In some cases, at step 305, the memory device (e.g., the periphery circuit 270 of memory device 200) may determine that the ECC function is enabled based on examining the register (e.g., the register 275). Subsequently, the memory device may activate an ECC circuit (e.g., the ECC circuit 280) at step 310.

At step 315, the memory device may, upon receiving a read command from a host device, retrieve first user-accessible data from the first subset. As set forth above, the memory device may have performed the ECC function— e.g., using the ECC circuit 280 in light of the ECC data stored in the second subset 265. In some embodiments, the memory device may detect at least one error in the first user-accessible data stored in the first subset using the ECC data stored in the second subset 265. Further, the memory device may correct the at least one error in the first user-accessible data before outputting the first user-accessible data to the host device. In this manner, one or more errors in the first user-accessible data may have been corrected prior to transmitting the first user-accessible data to the host device. At step 320, the memory device may communicate with the host device (e.g., transmit the first user-accessible data to the host device) for a first burst length (e.g., BL32).

Alternatively, at step 325, the memory device may, upon receiving a write command from the host device, receive first user-accessible data from the host device for the first burst length when the ECC function is enabled. Subsequently, the memory device may generate ECC data (e.g., ECC parity bits) associated with the first user-accessible data. At step 330, the memory device may store the first user-accessible data in the first subset and store the ECC data associated with the first user-accessible data in the second subset.

In other cases, referring to the step 305, the memory device (e.g., the periphery circuit 270 of memory device 200) may determine the ECC function is disabled based on examining the register (e.g., the register 275). Subsequently, the memory device may bypass the ECC circuit (e.g., the ECC circuit 280) at step 340.

At step 345, the memory device may, upon receiving a read command from a host device, retrieve the first user-accessible data in the first subset and second user-accessible data or metadata in the second subset, where the second subset may be further configured to store the second user-accessible data, the metadata, or both when the ECC function is disabled. In some embodiments, the memory device may concurrently access the first and the second subsets of the set of memory cells when the ECC function is disabled. In some embodiments, the memory device may combine the first user-accessible data and the second user-accessible data or the metadata for transmission to the host device.

In some embodiments, the memory device may determine a second burst length during which the memory device transmits the first user-accessible data and the second user-accessible data or the metadata. The memory device may determine the second burst length (e.g., BL34) based on a quantity of the second user-accessible data or of the metadata, where the second burst length is greater than the first burst length. Further, the memory device may determine the second burst length by incrementing the first burst length by an even number of bursts. For example, the memory device may determine BL34 from BL32 by incrementing two bursts that correspond to one clock cycle under the DDR scheme.

In other examples, the memory device may determine BL36 (by incrementing four bursts that correspond to two clock cycles), BL38 (by incrementing six bursts that correspond to three clock cycles), or BL40 (by incrementing eight bursts that correspond to four clock cycles) from BL32.

At step 350, the memory device may communicate with the host device (e.g., transmit) the first user-accessible data and the second user-accessible data or the meta data for the second burst length (e.g., BL34). Alternatively, at step 355, the memory device may, upon receiving a write command from the host device, receive the first user-accessible data and the second user-accessible data from the host device for the second burst length. Subsequently at step 360, the memory device may store the first user-accessible data in the first subset and store the second user-accessible data in the second subset.

Figure 4:
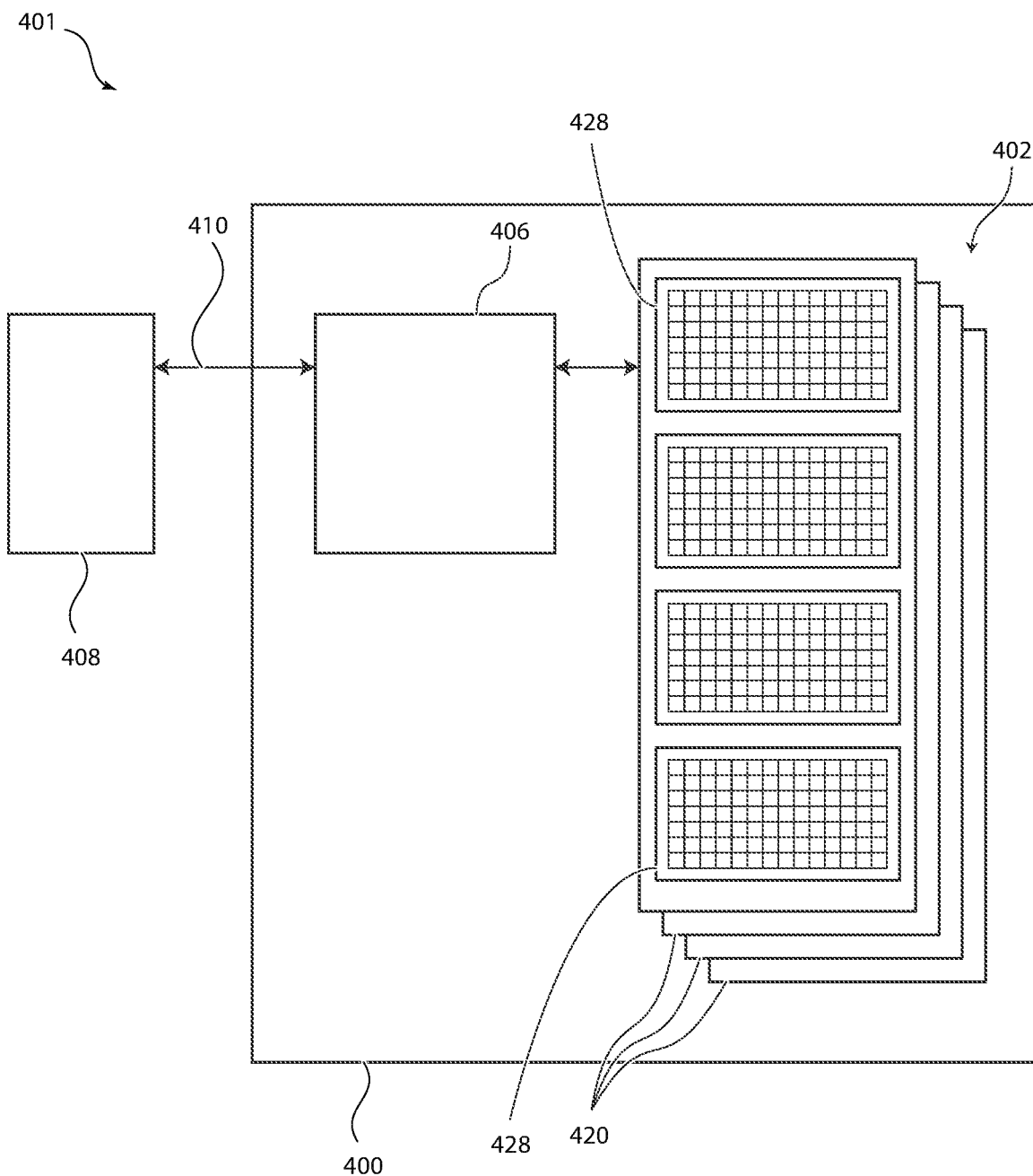
FIG. 4 is a block diagram schematically illustrating a memory system in accordance with an embodiment of the present technology.

FIG. 4 is a block diagram of a system 401 having a memory device 400 configured in accordance with an embodiment of the present technology. The memory device 400 may be an example of or include aspects of the memory devices 100 or 200 described with reference to FIGS. 1 and 2. As shown, the memory device 400 includes a main memory 402 (e.g., DRAM, NAND flash, NOR flash, FeRAM, PCM, etc.) and control circuitry 406 operably coupled to a host device 408 (e.g., an upstream central processor (CPU)). The main memory 402 may be an example of or include aspects of the memory array 150 or 250 described with reference to FIGS. 1 and 2. Further, the control circuitry 406 may be an example of or include aspects of the periphery circuit 270 described with reference to FIG. 2. The main memory 402 includes a plurality of memory units 420, which each include a plurality of memory cells. The memory units 420 can be individual memory dies, memory planes in a single memory die, a stack of memory dies vertically connected with through-silicon vias (TSVs), or the like. For example, in one embodiment, each of the memory units 420 can be formed from a semiconductor die and arranged with other memory unit dies in a single device package. In other embodiments, multiple memory units 420 can be co-located on a single die and/or distributed across multiple device packages. The memory units 420 may, in some embodiments, also be sub-divided into memory regions 428 (e.g., banks, ranks, channels, blocks, pages, etc.).

The memory cells can include, for example, floating gate, charge trap, phase change, capacitive, ferroelectric, magnetoresistive, and/or other suitable storage elements configured to store data persistently or semi-persistently. The main memory 402 and/or the individual memory units 420 can also include other circuit components, such as multiplexers, decoders, buffers, read/write drivers, address registers, data out/data in registers, etc., for accessing and/or programming (e.g., writing) the memory cells and other functionality, such as for processing information and/or communicating with the control circuitry 406 or the host device 408. Although shown in the illustrated embodiments with a certain number of memory cells, rows, columns, regions, and memory units for purposes of illustration, the number of memory cells, rows, columns, regions, and memory units can vary, and can, in other embodiments, be larger or smaller in scale than shown in the illustrated examples. For example, in some embodiments, the memory device 400 can include only one memory unit 420. Alternatively, the memory device 400 can include two, three, four, eight, ten, or more (e.g., 16, 32, 64, or more) memory units 420. Although the memory units 420 are shown in FIG. 4 as including four memory regions 428 each, in other embodiments, each memory unit 420 can include one, two, three, eight, or more (e.g., 16, 32, 64, 100, 128, 256 or more) memory regions.

In one embodiment, the control circuitry 406 can be provided on the same die as the main memory 402 (e.g., including command/address/clock input circuitry, decoders, voltage and timing generators, input/output circuitry, etc.). In another embodiment, the control circuitry 406 can be a microcontroller, special purpose logic circuitry (e.g., a field programmable gate array (FPGA), an application specific integrated circuit (ASIC), control circuitry on a memory die, etc.), or other suitable processor. In one embodiment, the control circuitry 406 can include a processor configured to execute instructions stored in memory to perform various processes, logic flows, and routines for controlling operation of the memory device 400, including managing the main memory 402 and handling communications between the memory device 400 and the host device 408. In some embodiments, the control circuitry 406 can include embedded memory with memory registers for storing, e.g., row counters, bank counters, memory pointers, fetched data, etc. In another embodiment of the present technology, a memory device 400 may not include control circuitry, and may instead rely upon external control (e.g., provided by the host device 408, or by a processor or controller separate from the memory device 400).

The host device 408 can be any one of a number of electronic devices capable of utilizing memory for the temporary or persistent storage of information, or a component thereof. For example, the host device 408 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device 408 may be a networking device (e.g., a switch, a router, etc.) or a recorder of digital images, audio and/or video, a vehicle, an appliance, a toy, or any one of a number of other products. In one embodiment, the host device 408 may be connected directly to memory device 400, although in other embodiments, the host device 408 may be indirectly connected to memory device (e.g., over a networked connection or through intermediary devices).

In operation, the control circuitry 406 can directly write or otherwise program (e.g., erase) the various memory regions of the main memory 402. The control circuitry 406 communicates with the host device 408 over a host-device bus or interface 410. In some embodiments, the host-device bus or interface 410 may be configured to carry data bursts having variable burst lengths. For example, the host-device bus or interface 410 may carry data bursts having a first burst length (e.g., BL32) or a second burst length (e.g., BL34, BL36, BL38, BL40) based on whether an ECC function of the memory device 400 is enabled (e.g., BL32) or disabled (e.g., BL34, BL36, BL38, BL40). In some embodiments, the host device 408 and the control circuitry 406 can communicate over a dedicated memory bus (e.g., a DRAM bus). In other embodiments, the host device 408 and the control circuitry 406 can communicate over a serial interface, such as a serial attached SCSI (SAS), a serial AT attachment (SATA) interface, a peripheral component interconnect express (PCIe), or other suitable interface (e.g., a parallel interface). The host device 408 can send various requests (in the form of, e.g., a packet or stream of packets) to the control circuitry 406. A request can include a command to read, write, erase, return information, and/or to perform a particular operation (e.g., a refresh operation, a TRIM operation, a precharge operation, an activate operation, a wear-leveling operation, a garbage collection operation, etc.).

In some embodiments, the control circuitry 406 can be configured to track operations (e.g., read operations, write operations, erase operations, activate operations, etc.) performed in the main memory 402 (e.g., in a register or table in an embedded memory of the control circuitry 406) in multiple memory units 420 to facilitate performing refresh operations on an as-needed basis. In this regard, the control circuitry 406 can be configured to compare the number or rate of operations experienced by different memory units 420 and to perform or schedule refresh operations on the memory units 420 based on a comparison between the number or rate of operations experienced by the memory units 420. Alternatively, the control circuitry 406 can be configured to perform or schedule refresh operations on the memory units 420 based on a comparison of each memory unit 420 to one or more predetermined thresholds (e.g., threshold numbers of operations, threshold rates of operations, etc.). Accordingly, a memory unit 420 which is the target of operations that exceed a threshold number or rate can be refreshed more frequently than another unit 420, due to the freedom with which different units 420 can be subjected to out-of-order refresh operations.

In some embodiments, the memory device 400 includes a register (e.g., register 275 described with reference to FIG. 2) configured to indicate whether an ECC function is enabled or disabled. Further, the main memory 402 may include a set of memory cells, where the set of memory cells comprises a first subset and a second subset. The first subset may be configured to store first user-accessible data. Moreover, the second subset may be configured to store ECC data when the register indicates the ECC function is enabled, and to store second user-accessible data, metadata, or both when the register indicates the ECC function is disabled. In some embodiments, the host device 408 and the memory device 400 are configured to communicate for a first burst length (e.g., BL32) when the register indicates the ECC function is enabled, where the first burst length is determined for communicating the first user-accessible data in the first subset. Additionally or alternatively, the host device 408 and the memory device 400 are configured to communicate for a second burst length (e.g., BL34, BL36, BL38, BL40) when the register indicates the ECC function is disabled, where the second burst length is determined for communicating the first user-accessible data in the first subset and the second user-accessible data or the metadata in the second subset.

In some embodiments, the host device 408 may transmit signaling to a mode register of the memory device 400 that indicates whether an ECC mode of the memory device 400 is enabled or disabled. Further, the host device 408 may transmit a read command to the memory device 400. Subsequently, the host device 408 may receive data in response to the read command, where a burst length of the data is based on whether the ECC mode is enabled or disabled, as indicated by the mode register.

In some embodiments, the host device 408, when the ECC function is disabled, may be configured to transmit an access command to the memory device 400, where the access command (e.g., read command, write command) comprises a set of address bits that concurrently identifies the first and the second subsets of the set of memory cells. Upon receiving a read command from the host device 408, the memory device 400 may bypass an ECC circuit configured to detect and correct an error in the first user-accessible data in the first subset, generate a set of data by combining the first user-accessible data and the second user-accessible data or the metadata, and transmit the set of data to the host device in accordance with the second burst length (e.g., BL34).

In some embodiments, the host device 408, when the ECC function is disabled, may be configured to receive a first set of data from the memory device 400 in a first data burst having the second burst length, determine the first set of data includes a first portion of the metadata, receive a second set of data from the memory device in a second data burst having the second burst length, determine the second set of data includes a second portion of the metadata, and combine the first portion of the metadata with the second portion of the metadata. In this manner, the host device 408 may receive the metadata from the memory device 400 over multiple instances of data transmissions that each occur in accordance with the second burst length. In some embodiments, the host device 408 may be configured to transmit to the memory device 400 an indication of enabling or disabling the ECC function such that the memory device 400 can set the register in accordance with the indication transmitted from the host device.

In some embodiments, the memory device 400, when the ECC function is disabled, may be configured receive a set of data from the host device with a data burst having the second burst length, where the set of data includes the first user-accessible data and the second user-accessible data, and store the first user-accessible data in the first subset and the second user-accessible data in the second subset. In some embodiments, the memory device 400 may be configured to set the register to indicate whether the ECC function is enabled or disabled during an initialization period of the memory system 401. In such embodiments, the initialization period may include a power-up procedure and the memory device 400 may include a parameter indicating a status of the ECC function (e.g., whether the ECC function is enabled or disabled) as a default value for the register.

FIG. 5 is a flow chart 500 illustrating a method of operating a memory device in accordance with an embodiment of the present technology. The flow chart 500 may be an example of or include aspects of a method that the memory device 200 (or the periphery circuit 270 of the memory device 200) may perform as described with reference to FIG. 2. Such memory device may include a memory array having a set of memory cells, where the set of memory cells includes a first subset configured to store first user-accessible data, and a second subset configured to store ECC data when the ECC mode of the memory device is enabled, and second user-accessible data or metadata, or both when the ECC mode of the memory device is disabled.

The method includes receiving signaling at a mode register of the memory device that indicates whether an ECC mode of the memory device is enabled or disabled (box 510). In accordance with one aspect of the present technology, the receiving feature of box 510 can be performed by a periphery circuit (e.g., the periphery circuit 270 of FIG. 2) or control circuitry (e.g., the control circuitry 406 of FIG. 4) in conjunction with an address/command input circuit (e.g., the address/command input circuit 105 of FIG. 1).

The method includes selecting a burst length for a data transmission from the memory device to a host device based on whether the mode register indicates that the ECC mode is enabled or disabled (box 520). In accordance with one aspect of the present technology, the selecting feature of box 520 can be performed by a periphery circuit (e.g., the periphery circuit 270 of FIG. 2) or control circuitry (e.g., the control circuitry 406 of FIG. 4).

The method includes transmitting the data with the selected burst length from the memory device to the host device (box 530). In accordance with one aspect of the present technology, the transmitting feature of box 530 can be performed by a periphery circuit (e.g., the periphery circuit 270 of FIG. 2) or control circuitry (e.g., the control circuitry 406 of FIG. 4) in conjunction with an input/output circuit (e.g., the input/output circuit 160 of FIG. 1).

The method can further include determining that the ECC mode of the memory device is disabled, where the burst length is selected from a first burst length and a second burst length with more bits than the first burst length, and transmitting the data with the second burst length from the memory device to the host device (box 540). In accordance with one aspect of the present technology, the determining and transmitting features of box 540 can be performed by the periphery circuit (e.g., the periphery circuit 270 of FIG. 2) or the control circuitry (e.g., the control circuitry 406 of FIG. 4) in conjunction with an input/output circuit (e.g., the input/output circuit 160 of FIG. 1).

In some embodiments, one or more bits of a transmission having the second burst length includes metadata for information about the transmitted data or the memory device, or both. In some embodiments, each bit of a transmission having the second burst length includes data. In some embodiments, the first burst length includes thirty-two (32) bits and the second burst length includes thirty-four (34) bits.

The method can further include determining that the ECC mode of the memory device is enabled, detecting at least one error in the first user-accessible data in the first subset using the ECC data in the second subset, and correcting the at least one error in the first user-accessible data before outputting the first user-accessible data to the host device. The method can further include concurrently accessing the first and the second subsets of the set of memory cells when the ECC function is disabled.

In some embodiments, the method can further include bypassing an ECC circuit configured to perform an ECC function for the first user-accessible data using the ECC data stored in the second subset, where transmitting the data with the selected burst length to the host device corresponds to transmitting the first user-accessible data and the second user-accessible data or metadata to the host device. In some embodiments, the method can further include determining a second burst length based on a quantity of the second user-accessible data or of the metadata, where the second burst length is greater than a first burst length and transmitting the data with the selected burst length to the host device corresponds to transmitting the first user-accessible data and the second user-accessible data or metadata to the host device. In some embodiments, determining the second burst length further comprises incrementing the first burst length by an even number of bursts.

In some embodiments, the method can further include combining the first user-accessible data and the second user-accessible data or metadata for transmission to the host device, where transmitting the data with the selected burst length to the host device corresponds to transmitting the first user-accessible data and the second user-accessible data or metadata to the host device. In some embodiments, the method can further include receiving third user-accessible data with the selected burst length from the host device, the third user-accessible data including the first user-accessible data and the second user-accessible data, storing the first user-accessible data in the first subset, and storing the second user-accessible data in the second subset.

FIG. 6 is a flow chart 600 illustrating a method of operating a system in accordance with an embodiment of the present technology. The flow chart 600 may be an example of or include aspects of a method that a host device (e.g., the host device described with reference to FIG. 2, the host device 408 described with reference to FIG. 4) may perform as described with reference to FIGS. 2 and 4.

The method includes transmitting signaling to a mode register of a memory device that indicates whether an ECC mode of the memory device is enabled or disabled (box 610). In accordance with one aspect of the present technology, the transmitting feature of box 610 can be performed by a host device (e.g., the host device 408 of FIG. 4).

The method includes transmitting a read command to the memory device (box 620). In accordance with one aspect of the present technology, the transmitting feature of box 620 can be performed by a host device (e.g., the host device 408 of FIG. 4).

The method includes receiving data in response to the read command, where a burst length of the data is based on whether the ECC mode is enabled or disabled, as indicated by the mode register (box 630). In accordance with one aspect of the present technology, the receiving feature of box 630 can be performed by a host device (e.g., the host device 408 of FIG. 4).

It should be noted that the methods described above describe possible implementations, and that the operations and the steps may be rearranged or otherwise modified and that other implementations are possible. Furthermore, embodiments from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The devices discussed herein, including a memory device, may be formed on a semiconductor substrate or die, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A method, comprising:
   enabling a mode of a memory device based on one or more values of a mode register of the memory device, the mode associated with a first burst length of a plurality of burst lengths;
   correcting, in accordance with an on-die error-correcting code (ECC) functionality of the memory device, at least one error in first data retrieved from a memory array of the memory device, the first data retrieved based at least in part on a read command;
   transmitting, based at least in part on the read command and at a time that is a number of clock cycles after the read command is received, the first data using the first burst length associated with the enabled mode after correcting the at least one error, the number of clock cycles based at least in part on latency information for the memory array;
   generating, in accordance with the on-die ECC functionality, a set of ECC bits for second data received via a write command; and
   writing, based at least in part on the write command and after generating the set of ECC bits, the second data and the set of ECC bits to the memory array.

2. The method of claim 1, further comprising:
   receiving the read command; and
   retrieving the first data from the memory array based at least in part on the read command.

3. The method of claim 1, further comprising:
   receiving the write command; and
   receiving the second data based at least in part on the write command, wherein generating the set of ECC bits is based at least in part on receiving the second data.

4. A method, comprising:
   enabling a mode of a memory device based on one or more values of a mode register of the memory device, the mode associated with a first burst length of a plurality of burst lengths;
   retrieving first data from a memory array based at least in part on a read command;
   transmitting, at a time that is a number of clock cycles after the read command is received, the first data using one or more DQ pins and using the first burst length associated with the enabled mode based at least in part on the read command, the number of clock cycles based at least in part on latency information for the memory array; and transmitting second data following the first data using the one or more DQ pins, the second data comprising information calculated from the first data and used to detect errors in the first data.

5. The method of claim 4, further comprising:
identifying at least one error in the first data; and
correcting the at least one error in the first data in accordance with an on-die error-correcting code (ECC) functionality.

6. The method of claim 5, further comprising:
calculating the information from the first data based at least in part on identifying the at least one error.

7. The method of claim 4, further comprising:
receiving a write command associated with third data; and
identifying at least one error in the third data.

8. The method of claim 7, further comprising:
writing the third data to the memory array; and
writing fourth data following the third data, the fourth data comprising second information calculated from the third data and used to detect the at least one error in the third data.

9. A method, comprising:
enabling a mode of a memory device based on one or more values of a mode register of the memory device, the mode associated with a first burst length of a plurality of burst lengths;
retrieving first data from a memory array based at least in part on a read command;
identifying at least one error in the first data;
correcting, in accordance with an on-die error-correcting code (ECC) functionality, the at least one error in the first data;
calculating information from the first data based at least in part on identifying and correcting the at least one error;
transmitting, at a time that is a number of clock cycles after the read command is received, the first data using one or more DQ pins and using the first burst length associated with the enabled mode based at least in part on the read command, the number of clock cycles based at least in part on latency information for the memory array; and
transmitting second data following the first data using the one or more DQ pins, the second data comprising the information calculated from the first data and used to detect errors in the first data.

10. The method of claim 9, further comprising:
receiving a write command associated with third data; and
identifying at least one second error in the third data.

11. The method of claim 10, further comprising:
writing the third data to the memory array; and
writing fourth data following the third data, the fourth data comprising second information calculated from the third data and used to detect second errors in the third data.

12. A memory device, comprising:
one or more memory arrays; and
one or more controllers coupled with the one or more memory arrays, the one or more controllers operable to:
  enable a mode of a memory device based on one or more values of a mode register of the memory device, the mode associated with a first burst length of a plurality of burst lengths;
  correct, in accordance with an on-die error-correcting code (ECC) functionality of the memory device, at least one error in first data retrieved from a memory array of the one or more memory arrays, the first data retrieved based at least in part on a read command;
  transmit, based at least in part on the read command and at a time that is a number of clock cycles after the read command is received, the first data and using the first burst length associated with the enabled mode after correcting the at least one error, the number of clock cycles based at least in part on latency information for the memory array;
  generate, in accordance with the on-die ECC functionality of the memory device, a set of ECC bits for second data received via a write command; and
  write, based at least in part on the write command and after generating the set of ECC bits, the second data and the set of ECC bits to the one or more memory arrays.

13. The memory device of claim 12, wherein the one or more controllers is further operable to:
receive the read command; and
retrieve the first data from the one or more memory arrays based at least in part on the read command.

14. The memory device of claim 12, wherein the one or more controllers is further operable to:
receive the write command; and
receive the second data based at least in part on the write command, wherein generating the set of ECC bits is based at least in part on receiving the second data.

* * * * *